United States Patent [19]

Kawada et al.

[11] Patent Number: 4,700,097
[45] Date of Patent: Oct. 13, 1987

[54] SYNCHRONOUS MACHINE

[75] Inventors: Shigeki Kawada, Hino; Yoichi Amemiya; Masatoyo Sogabe, both of Hachioji; Noboru Iwamatsu, Hino, all of Japan

[73] Assignee: Fanuc Ltd., Tokyo, Japan

[21] Appl. No.: 902,130

[22] PCT Filed: Dec. 21, 1983

[86] PCT No.: PCT/JP83/00446

§ 371 Date: Aug. 24, 1984

§ 102(e) Date: Aug. 24, 1984

[87] PCT Pub. No.: WO84/02617

PCT Pub. Date: Jul. 5, 1984

Related U.S. Application Data

[63] Continuation of Ser. No. 645,743, Aug. 24, 1984, abandoned.

[30] Foreign Application Priority Data

Dec. 24, 1982 [JP] Japan ................................. 57-225943

[51] Int. Cl.⁴ ............................................... H02K 21/00
[52] U.S. Cl. ........................................ 310/162; 310/156
[58] Field of Search ............ 310/162, 163, 164, 49 R, 310/152, 156, 181, 216, 217, 218, 254, 261

[56] References Cited

U.S. PATENT DOCUMENTS

| | | | |
|---|---|---|---|
| 3,210,584 | 10/1965 | Jorgensen | 310/162 |
| 3,230,434 | 1/1966 | Bauerlein | 310/156 |
| 3,334,254 | 8/1967 | Kober | 310/156 |
| 3,654,503 | 4/1972 | Whitney | 310/162 |
| 3,671,780 | 6/1972 | Knudson | 310/156 |
| 3,671,789 | 6/1972 | Menzies | 310/163 |
| 4,327,302 | 4/1982 | Hershberger | 310/156 |
| 4,385,250 | 5/1983 | Welburn | 310/162 |
| 4,475,051 | 10/1984 | Chai | 310/162 |
| 4,486,678 | 12/1984 | Olson | 310/156 |
| 4,543,506 | 9/1985 | Kawada et al. | 310/156 |

FOREIGN PATENT DOCUMENTS

| | | | |
|---|---|---|---|
| 0060894 | 9/1982 | European Pat. Off. | 310/156 |
| 57264 | 4/1982 | Japan . | |
| 99253 | 6/1983 | Japan . | |
| 2075274 | 11/1980 | United Kingdom | 310/156 |

Primary Examiner—R. Skudy
Attorney, Agent, or Firm—Armstrong, Nikaido, Marmelstein & Kubovcik

[57] ABSTRACT

A synchronous machine comprising a stator (41) having armature windings matching to a $\phi$ phase power source and S number of slots (42) accommodating the armature windings, and a rotor (31) having a number of field poles (32) identical with the P number of poles of the rotor (31) and magnets (33) for exciting the field pole (32), in which where the number of the slots per pole per phase $S/P\phi$ is expressed by an irreducible fraction m/n, the length (W) of the portion of the field pole (32) facing to the slots (42) of the stator (41) along the circular direction is selected out of the integer multiple value of 1/n of the slot (42) pitch length (L) in the stator (41), whereby slot ripple is reduced and the lack of uniformity of the velocity at light load operation is decreased when the synchronous machine is used as a servomotor.

7 Claims, 12 Drawing Figures

W = 2.7 L

W = 3 L

SYNCHRONOUS MACHINE

This application is a continuation of application Ser. No. 645,743 filed Aug. 24, 1984 now abandoned.

DESCRIPTION

1. Technical Field

The present invention relates to a synchronous machine, more particularly to the shape of field poles of a synchronous machine.

2. Background Art

The schematic sectional diagram of a synchronous machine having armature windings and slots accommodating the windings in a stator thereof and having field poles and magnets in a rotor thereof, is shown in FIG. 1. The stator 21 has slots 22 for accommodating the windings (not shown). Although the slots 22 are provided around the entire periphery of the stator 21, only a portion of them are shown in FIG. 1, the rest are omitted The rotor 11 comprises field poles 12 and magnets 13. The magnets 13 are made, for example, of ferrite or the like. The field poles 12 are punched from a thin plate. The thin plates are piled and fixed by fastening with a bolt (not shown) through a hole 14. When alternating current is supplied to the armature windings of the stator 21, the rotor 11 rotates In the above-mentioned synchronous machine, hitherto, the length of the portion of the field pole 12 facing to the slots 22 along the circumferential direction is determined by the shape of the magnet 13 and the shape of the end portion 15 of the field pole 12, which is limited by thin plate punching, and the length dimension did not take into consideration the pitch of the slots 22. In the synchronous machine produced as mentioned above torque ripple occurs at no load rotation, that is, slot ripple caused by the slots. Slot ripple occurring at no load rotation has a harmful effect due to a lack of uniformity of the velocity when the synchronous machine is operated at a light load as a servomotor. It is already known that the above-mentioned slot ripple can be reduced without considering the relationship between the slot pitch and the length of the field pole 12 along the circumferential direction, if the distribution of the magnetic flux density in an air gap between the stator 21 and the rotor 11, is sinusoidal. However, realization of this state is very difficult, and in particular, it prevents miniaturization of the synchronous machine. Accordingly, it became necessary to determine the optimum relationship between the slot pitch and the length of the field pole 12 along the circumferential direction, to reduce the slot ripple at no load rotation in the synchronous machine.

The present invention was made in consideration of the above-mentioned necessity.

DISCLOSURE OF THE INVENTION

An object of the present invention is to provide a synchronous machine capable of reducing the slot ripple and decreasing the lack of uniformity of the velocity at light load operation as a servomotor, by determining the length of the field pole along the circumferential direction to an integer multiple of 1/n of the slot pitch, where the number of the slots per pole per phase $\beta$ is expressed by an irreducible fraction m/n.

According to the present invention, there is provided a synchronous machine comprising a stator having armature windings matching a $\phi$ phase power source and S number slots accommodating the armature windings; a rotor having a number of field poles identical with the P number of poles of the rotor and magnets for exciting the field poles; wherein where the number of the slots per pole per phase $S/P\phi$ is expressed by the irreducible fraction m/n, i.e. $S/P\phi = m/n$, where m and n are integral numbers representing the numerator and denominator, respectively of $S/P\phi$ reduced to an irreducible fraction, the length of the portion of the field pole facing to the slots of the stator along the circumferential direction is selected out of the integer multiple value of 1/n of the slot pitch length in the stator

BEST MODE FOR CARRYING OUT THE INVENTION

Figure 1:
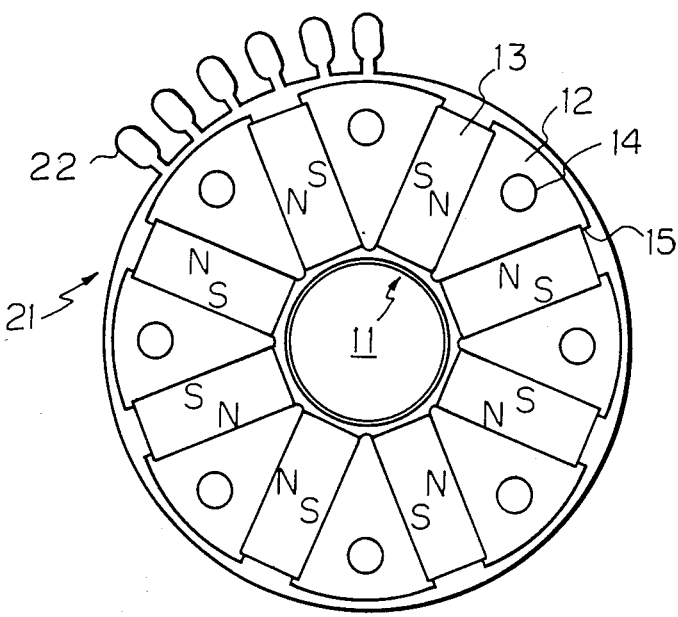
FIG. 1 is a schematic sectional diagram of a synchronous machine for explaining the backgroud art regarding the present invention.
Figure 2:
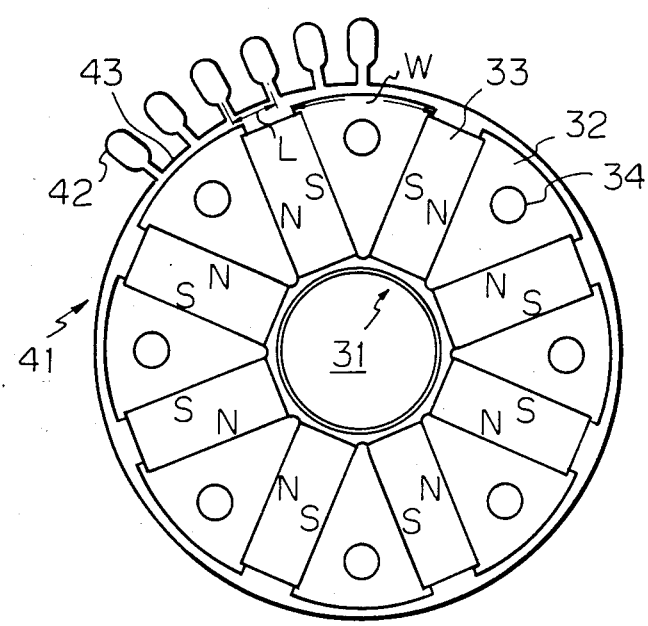
FIG. 2 is a schematic sectional diagram of a synchronous machine according to an embodiment of the present invention.

In FIG. 2, a schematic sectional diagram of a synchronous machine according to an embodiment of the present invention is shown. Slots 42 in a stator 41 are arranged, for example, at 36 places along the inner periphery of the stator 41. In the figure, only six slots are shown and the others are omitted. The length of the pitch of the slots 42 is expressed by L. The magnets 33 in a rotor 31 are substantially the same as the conventional ones shown in FIG. 1. Namely, the magnet is made of ferrite or the like, is a permanent magnet made by a grinding process or the like, and has N and S poles as shown in the figure. A field pole 32 comprises ferromagnetic thin plates and is fastened and fixed by a bolt through a hole 34. The rotor 31 comprises the 8 field poles 32 and 8 magnets 33. The length of the portion of the field pole 32 facing to the slots 42 along the circumferential direction, is expressed by W. The number of slots per pole per phase $\beta$ in this synchronous machine is $$\frac{S}{P\phi} = \frac{36}{8 \times 3} = \frac{36}{24}.$$

Where S is the number of slots in the stator, P is the number of poles in the rotor, i.e., the number of field poles or magnets, and $\phi$ is the number of phases in the power source. In this embodiment, a 3 phase alternating current is applied. Consequently, the irreducible fraction m/n, which expresses the number of slots per poles per phase, $$\beta = \frac{36}{24},$$

is 3/2, namely m=3 and n=2. The length W of the field pole 32 is selected as $L \times N/2$, where the N is an arbitrary natural number. That is, the W is selected from 0.5 L, 1.0 L, 1.5 L, 2.0 L, 2.5 L, 3.0 L, 3.5 L, 4.0 L, and 4.5 L. However, in actual practice, 2.0 L and below and 4.5 L cannot be used because of the limitations due to the shape.

The reduction of slot ripple at noe load rotation is explained where the W is selected as $L \times N/n$. Since the slot ripple at no load rotation is caused by the change of total magnetic reluctance all around the rotor when the rotor of the synchronous machine rotates, the condition wherein the change of the facing area between the field poles 32 and the slot teeth 43 of the stator 41 all around the rotor regarding every obtainable value of n is minimized, may be obtained.

Figure 3:
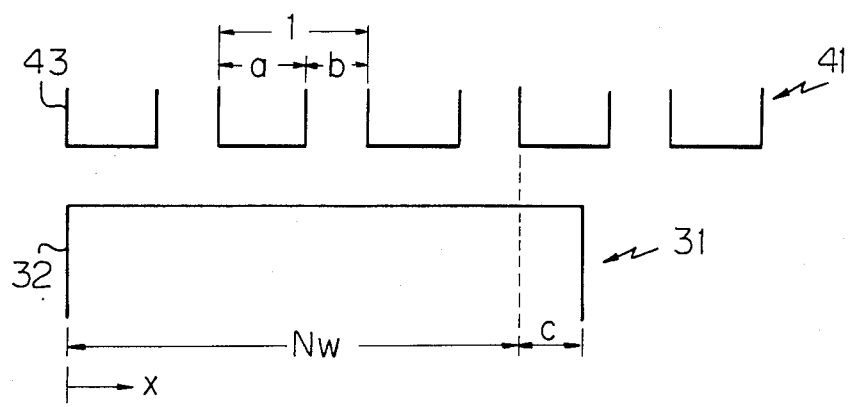
FIG. 3 is an enlarged and expanded diagram of the relationship between a field pole and slot teeth in a synchronous machine.
Figure 4:
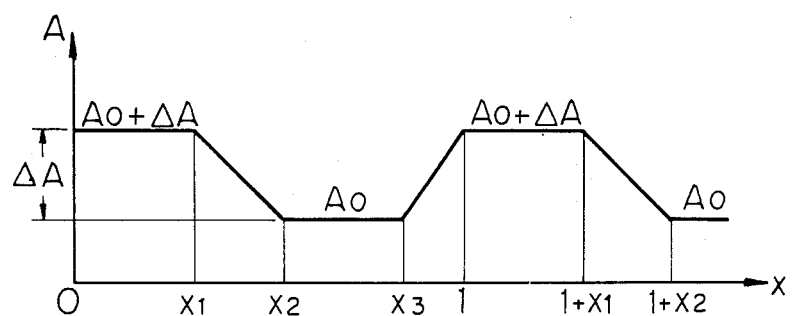
FIG. 4 is a diagram of the relationship between the moving distance of the field pole and the facing area of the field pole with the slot teeth in the synchronous machine.

Usually, n is expressed by $n=2^k$, (k=0, 1, 2, 3, ...). The obtainable values of n are generally 1, 2, or 4. In FIG. 3, an enlarged diagram showing the relationship between the field pole 32 and the slot teeth 43, is shown. In the figure, for convenience, the length of the slot pitch is defined as a reference, namely, as "1", the width of the slot tooth is defined as a, the width of the slot opening is defined as b, and the length W of the field pole is defined as $N_w + c$. $N_w$ is a positive integer, and c represents the fractional portion by which the rotor pole width exceeds an integral multiple of stator slot pitch, i.e. $0 \leq c \leq 1$, and it is assumed that a>b. Since, the magnetic reluctance at air gap is treated, it is no problem to assume a>b. In the above-mentioned condition, when the rotor moves to the x direction, the manner of the change of facing area between the field poles 32 and the slot teeth 43 is explained where n is 1, 2, or 4 with reference to FIGS. 3 to 6. In FIG. 4, the change of the facing area A between one of the field poles 32 and the slot teeth 43 is shown as a function of the moving distance x (the length of the slot pitch is defined as the reference).

(1) Where n=1, namely, $\beta = m/1$.

The change of the facing area all around the rotor becomes the same pattern as that of FIG. 4. Namely, during the interval wherein the field pole 32 moves up to the distance $x_1$, the facing area A is $(A_0 + \Delta A)$, during the interval from distance $x_1$ to $x_2$ the facing area gradually reduces, at distance $x_2$ the facing area is $A_0$, the facing area gradually increases from distance $x_3$, and at distance "1" the facing area returns to $(A_0 + \Delta A)$. In this case, c=0 or c=1 is the condition in which there is no change of the facing area.

(2) Where n=2, namely, $\beta = m/2$.

Figure 5:
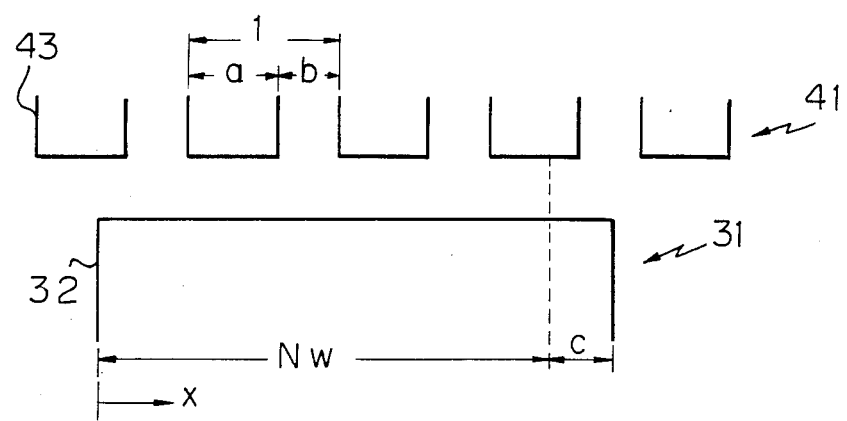
FIG. 5 is an enlarged and expanded diagram similar to FIG. 3 of the case where the relative position is shifted by ½ pitch between the field pole and the slot teeth.
Figure 6:
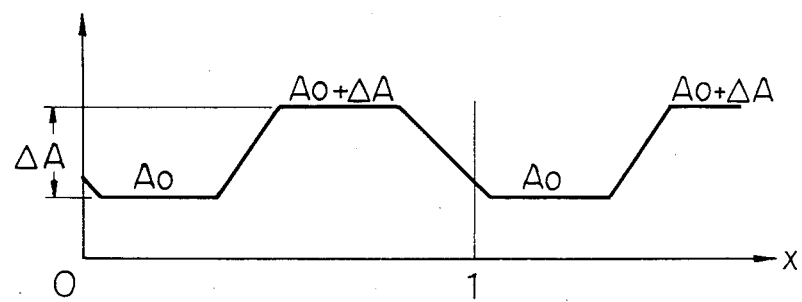
FIG. 6 is a diagram similar to FIG. 4 of the case where the relative position is shifted by ½ pitch between the pole and the slot teeth.
Figure 7:
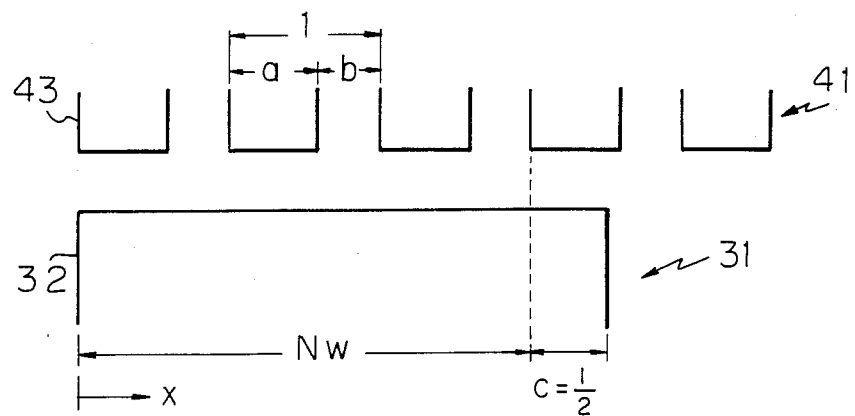
FIG. 7 is a diagram similar to FIG. 3 of the case where c=1/2 according to the present embodiment.
Figure 8:
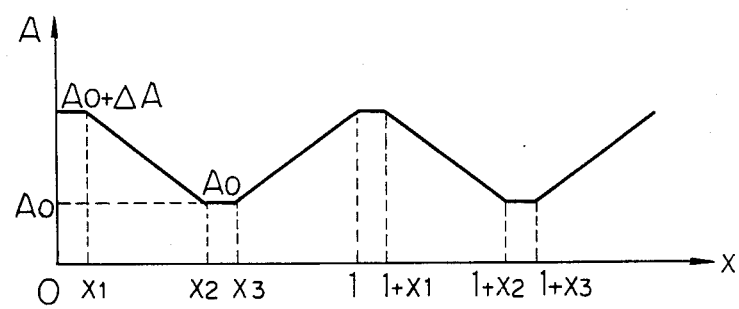
FIG. 8 is a diagram similar to FIG. 4 of the case where c=1/2 according to the present embodiment.
Figure 9:
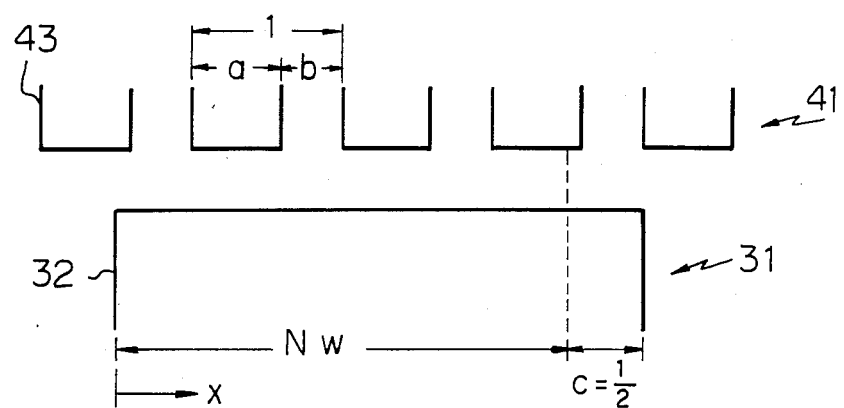
FIG. 9 is a diagram similar to FIG. 5 of the case where c=1/2 according to the present embodiment.
Figure 10:
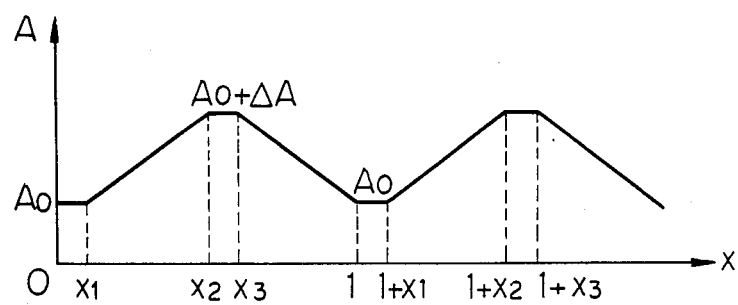
FIG. 10 is a diagram similar to FIG. 6 of the case where c=1/2 to the present embodiment.

In this case, the characteristics of the change of the facing area to the slot teeth in mutually adjoining field poles are different, and in total are the characteristic of the change of the facing area all around the rotor. Namely, if the characteristic of the change of the facing area between one field pole and the slot teeth is as shown in FIG. 4, the characteristics of the change of the facing areas regarding the field poles arranged alternately to the one field pole become the same. On the other hand, another field pole adjoining the one field pole and other field poles alternately arranged to the field pole adjoining the one field pole have a relative position to the slot teeth as shown in FIG. 5. As a result, the adjoining field pole and the like have the characteristic of change of the facing area as shown in FIG. 6. The characteristic is the same as that of the pattern shown in FIG. 4 of shifting the origin by the distance of ½ pitch. Therefore, the characteristic of the change of the facing area all around the rotor is obtained as a pattern adding to the pattern shown in FIG. 4 and the pattern shown in FIG. 6. As a result, the conditions wherein the facing area does not change due to the rotation of the rotor, are c=0, c=1/2 or c=1.

In FIGS. 7 to 10, the diagrams corresponding to FIGS. 3 to 6 are shown where c=1/2 as mentioned above. From this, it can be understood that a flat characteristic pattern is obtained by addition of the pattern shown in FIG. 8 and the pattern shown in FIG. 10.

(3) Where n=4, namely, $\beta = m/4$.

The pattern showing the change of the facing area all around the rotor is obtained by the total addition of the summation of three patterns obtained by shifting with ¼ pitch one after another from the pattern shown in FIG. 4 and the pattern shown in FIG. 4 itself. The conditions in which there is no change of the facing area are c=0, c=1/4, c=1/2, c=3l/4, or c=1.

Figure 11:
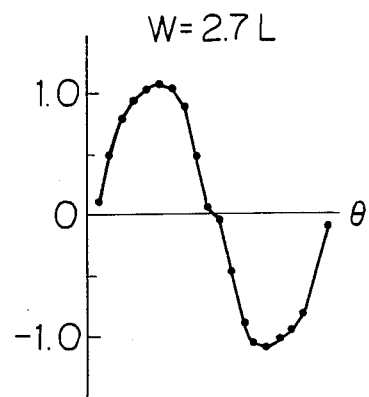
FIG. 11 is a grap showing the change of permeance for two poles in the conventional synchronous machine.
Figure 12:
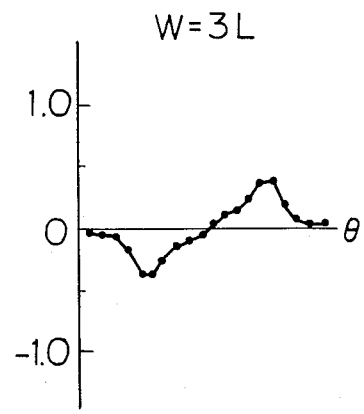
FIG. 12 is a graph showing the change of permeance for two poles in the synchronous machine according to the present embodiment.

In FIGS. 11 and 12, the changes of permeance for two poles during 1/72 rotation are calculated respectively in the conventional synchronous machine and the synchronous machine according to the embodiment of the present invention. The change of permeance for two poles is obtained because the pattern showing the characteristic of the change of the permeance for two poles is the same as that of for all around the rotor, since $\beta = 3/2$. FIG. 11 shows where $\beta = 3/2$ and W=2.7 L in the conventional synchronous machine. FIG. 12 shows where $\beta = 3/2$ and W=3.0 L in the synchronous machine of the present embodiment. The abscissa expresses angle $\theta$ and the ordinate expresses the relative value of permeance (inverse number of magnetic reluctance). Consequently, it can be understood that the change of magnetic reluctance between the field poles and the slot teeth generated by the rotation of the synchronous machine of the present embodiment is less than that of the conventional one. The reduction of the change of the magnetic reluctance results in the decrease of the slot ripple at no load rotation as mentioned above.

As explained, if the length W of the field pole is an integer multiple of the length L/n, the change of the facing area between the field poles and the slot teeth due to the rotation is reduced.

We claim:

1. A synchronous machine operated as a servo motor comprising a stator having armature windings to be connected to a $\phi$ phase power source and formed with S number of uniformly spaced slots accommodating the armature windings, and a rotor having a number of equally spaced filed poles identical with the P number of poles of the rotor and permanent magents for exciting the field poles;

wherein where the number of slots per pole per phase of said power source S/P φ is expressed by an irreducible fraction m/n, where m and n are integral numbers representing the numerator and demominator of said irreducible fraction, respectively the length of the portion of each permanent magnet excited field pole facing to the slots of stator along the circumferential direction is selected from the values of the slot pitch of the stator multiplied by N/n where n is an arbitrary natural number such that lack of uniform velocity of said rotor caused by variation of magnetic reluctance at said field poles due to the relative positions between said stator slots and said permanent magnet rotor poles is reduced.

2. A synchronous machine as set forth in claim 1, wherein when the number of the phase of the power source is three, the number of slots is 36, the number of poles in the rotor is 8, and the length of the portion of the field pole facing to the slots in the stator along the circumferential direction is three times that of the slot pitch length in the stator.

3. A synchronous machine operated as a servo motor comprising:

a stator formed with a plurality of equally spaced slots therein and having armature windings accommodated in said slots, said slots having slot teeth therebetween;

a rotor positioned in said stator and having a plurality of equally spaced field poles forming a magnetic path, said rotor including permanent magnets for exciting said field poles; and wherein the length of said permanent magnet excited field poles in the circumferential direction in facing relationship to said slot teeth is selected to satisfy the formula $W = L \times N/n$ wherein W is the field pole length, L is the circumferential pitch of the stator slots, N is an arbitrary integer, and n is a number selected from the group 1, 2 and 4, such that the total facing area between said permanent magnet excited field poles and said slot teeth remains the same as the rotor turns to maintain a constant magnetic relucteness in said magnetic path and thereby reduce slot ripple effect upon torque of said servo motor.

4. A synchronous machine as claimed in claim 3 wherein n=1.

5. A synchronous machine as claimed in claim 3 wherein n=2.

6. A synchronous machine as claimed in claim 3 wherein n=4.

7. A synchronous machine as claimed in claim 3 wherein said field poles of said rotor are spaced from each other to receive said permanent magnets therebetween.

* * * * *

UNITED STATES PATENT AND TRADEMARK OFFICE
CERTIFICATE OF CORRECTION

PATENT NO. : 4,700,097

DATED : October 13, 1987

INVENTOR(S) : Shigeki KAWADA et al

It is certified that error appears in the above-identified patent and that said Letters Patent is hereby corrected as shown below:

Column 1, line 21, "omitted" should read --omitted.--.

Column 3, line 24, "noe" should read --no--.

Column 4, line 34, "c = 31/4" should read --c = 3/4--.

Column 5, line 7, "demominator" should read --denominator--.

Column 5, line 12, "where n is" should read --where N is--.

Signed and Sealed this

Seventh Day of June, 1988

Attest:

DONALD J. QUIGG

Attesting Officer

Commissioner of Patents and Trademarks